United States Patent
Son et al.

(10) Patent No.: US 9,569,813 B2
(45) Date of Patent: Feb. 14, 2017

(54) METHOD AND APPARATUS FOR TILE-BASED RENDERING

(71) Applicant: SAMSUNG ELECTRONICS CO., LTD., Suwon-si, Gyeonggi-do (KR)

(72) Inventors: Sung Jin Son, Yongin-si (KR); Sang Oak Woo, Anyang-si (KR); Seok Yoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 13/875,585

(22) Filed: May 2, 2013

(65) Prior Publication Data
US 2014/0152650 A1    Jun. 5, 2014

(30) Foreign Application Priority Data
Nov. 30, 2012  (KR) .......................... 10-2012-0137782

(51) Int. Cl.
*G06T 15/00* (2011.01)
*G06T 1/60* (2006.01)

(52) U.S. Cl.
CPC ............... *G06T 1/60* (2013.01); *G06T 15/005* (2013.01)

(58) Field of Classification Search
CPC .......... G06T 15/00; G06T 15/005; G06T 1/60; G06T 19/00; G06T 17/20; G06T 17/00; G06T 15/10
See application file for complete search history.

(56) References Cited

U.S. PATENT DOCUMENTS

| | | | |
|---|---|---|---|
| 6,344,852 B1 | 2/2002 | Zhu et al. | |
| 6,741,243 B2 | 5/2004 | Lewis et al. | |
| 7,170,515 B1 | 1/2007 | Zhu | |
| 7,286,134 B1 | 10/2007 | Van Dyke et al. | |
| 8,040,349 B1 | 10/2011 | Danskin | |
| 8,059,131 B1 | 11/2011 | Bittel et al. | |
| 8,886,715 B1 * | 11/2014 | Zhu et al. | 709/203 |
| 2002/0039100 A1 * | 4/2002 | Morphet | 345/553 |
| 2002/0092030 A1 * | 7/2002 | Gu | 725/134 |
| 2009/0066694 A1 | 3/2009 | Redshaw et al. | |
| 2010/0177105 A1 | 7/2010 | Nystad et al. | |
| 2011/0043518 A1 * | 2/2011 | Von Borries et al. | 345/419 |
| 2011/0102440 A1 | 5/2011 | Yuen et al. | |
| 2011/0298813 A1 | 12/2011 | Barringer et al. | |

FOREIGN PATENT DOCUMENTS

KR    10-2004-0072696    8/2004

* cited by examiner

*Primary Examiner* — James A Thompson
*Assistant Examiner* — Xilin Guo
(74) *Attorney, Agent, or Firm* — NSIP Law

(57) ABSTRACT

A method for tile-based rendering may include verifying a size of a memory available in an apparatus for rendering, and determining a number of buffers required for performing a rendering based on graphics data input, and may further include determining a size of a tile to be used for performing the rendering based on the determined number of buffers and the size of the memory available.

16 Claims, 5 Drawing Sheets

FIG. 5

| Col 511 | Depth 512 | Stencil 513 | Total 514 | Square Tile Size 515a | 1:2 Rectangular Tile Size 516a | Memory 517a | Square Tile Size 515b | 1:2 Rectangular Tile Size 516b | Memory 517b |
|---|---|---|---|---|---|---|---|---|---|
| 1 | 1 | 1 | 3 | 37.0 | 26.1 | 4,096 | 45.3 | 32.0 | 6,144 |
| 2 | 1 | 1 | 4 | 32.0 | 22.6 | 4,096 | 39.2 | 27.7 | 6,144 |
| 3 | 1 | 1 | 5 | 28.6 | 20.2 | 4,096 | 35.1 | 24.8 | 6,144 |
| 4 | 1 | 1 | 6 | 26.1 | 18.5 | 4,096 | 32.0 | 22.6 | 6,144 |
| 4 | 4 | 4 | 12 | 18.5 | 13.1 | 4,096 | 22.6 | 16.0 | 6,144 |
| 8 | 4 | 4 | 16 | 16.0 | 11.3 | 4,096 | 19.6 | 13.9 | 6,144 |
| 12 | 4 | 4 | 20 | 14.3 | 10.1 | 4,096 | 17.5 | 12.4 | 6,144 |
| 16 | 4 | 4 | 24 | 13.1 | 9.2 | 4,096 | 16.0 | 11.3 | 6,144 |
| 1 | 1 | - | 2 | 45.3 | 32.0 | 4,096 | 55.4 | 39.2 | 6,144 |
| 2 | 1 | - | 3 | 37.0 | 26.1 | 4,096 | 45.3 | 32.0 | 6,144 |
| 3 | 1 | - | 4 | 32.0 | 22.6 | 4,096 | 39.2 | 27.7 | 6,144 |
| 4 | 1 | - | 5 | 28.6 | 20.2 | 4,096 | 35.1 | 24.8 | 6,144 |
| 4 | 4 | - | 8 | 22.6 | 16.0 | 4,096 | 27.7 | 19.6 | 6,144 |
| 8 | 4 | - | 12 | 18.5 | 13.1 | 4,096 | 22.6 | 16.0 | 6,144 |
| 12 | 4 | - | 16 | 16.0 | 11.3 | 4,096 | 19.6 | 13.9 | 6,144 |
| 16 | 4 | - | 20 | 14.3 | 10.1 | 4,096 | 17.5 | 12.4 | 6,144 |

METHOD AND APPARATUS FOR TILE-BASED RENDERING

CROSS-REFERENCE TO RELATED APPLICATIONS

This application claims the priority benefit of Korean Patent Application No. 10-2012-0137782, filed on Nov. 30, 2012, in the Korean Intellectual Property Office, the disclosure of which is incorporated herein by reference.

BACKGROUND

1. Field

One or more embodiments relate to a method and apparatus for rendering, and more particularly, to a method and apparatus for tile-based rendering.

2. Description of the Related Art

A display device representing an image in a two-dimensional (2D) setting may represent a three-dimensional (3D) model more realistically, using 3D graphics. Research into providing information using the 3D graphics is being conducted because an effect of representing the 3D model more realistically may be achieved.

In a case of representing the 3D model using the 3D graphics, the display device to be viewed by a user may provide a 2D screen. Accordingly, there is a need for a process of converting the 3D model into the 2D screen viewed from a viewpoint of the user. As such, in the converting of the 3D model into the 2D screen, multiple graphic calculations may be used.

The method for tile-based rendering may divide a screen into a small basic unit, such as a tile, and perform a rendering on the tile. In the method for tile-based rendering, a memory space required for a geometry processing may be difficult to be estimated. Further, an external memory as well as an internal memory may need to be used because a significant size of a result produced by the geometry processing. When a small tile is used, the significant size of the result produced by the geometry processing may increase. Correspondingly, use of the external memory may grow due to the increase of the significant size of the result produced by the geometry processing. Accordingly, a size of the tile may be of crucial importance in utilizing a memory.

SUMMARY

The foregoing and/or other aspects may be achieved by one or more embodiments of a method for tile-based rendering, in which the method may include checking a size of a memory available in an apparatus for rendering, determining a number of buffers required for performing a rendering, based on graphics data input, and determining a size of a tile to be used when performing the rendering, based on the determined number of buffers and the size of the memory available in the apparatus for rendering.

The size of the tile may be determined to be inversely proportional to the number of buffers.

The determining of the size of the tile may include calculating a quotient by dividing the size of the memory available by the number of buffers, and determining the size of the tile wherein a value obtained by multiplying a width of the tile and a height of the tile is less than or equal to the calculated quotient.

The determining of the size of the tile may be performed based on a type of a pixel format to be applied to the rendering.

The determining of the size of the tile may include determining a type of a pixel format to be applied to the rendering, generating a first calculation value by multiplying a size of a memory for a plurality of pixels corresponding to the determined type of the pixel format and the number of buffers, generating a second calculation value by dividing the size of the memory available by the first calculation value, and determining the size of the tile wherein a value obtained by multiplying the width of the tile and the height of the tile is less than or equal to the second calculation value.

The determining of the number of buffers required for the rendering may include determining at least one type of a buffer required for performing the rendering from among a plurality of distinctive types of buffers, based on the graphics data input, and determining the number of buffers required for performing the rendering, based on the at least one type of the buffer determined.

The plurality of distinctive types of buffers may be configured by at least one buffer.

The graphics data input may be provided from an application requesting the apparatus for rendering to perform the rendering.

The method for tile-based rendering may further include performing a rendering, based on the determined size of the tile.

The foregoing and/or other aspects may be achieved by one or more embodiments of an apparatus for tile-based rendering, in which the apparatus may include a memory verifier to verify a size of a memory available in an apparatus for rendering, a buffer determiner to determine a number of buffers required for performing a rendering, based on graphics data input, and a tile determiner to determine a size of a tile to be used when performing the rendering, based on the determined number of buffers and the size of the memory available in the apparatus for rendering.

The foregoing and/or other aspects may be achieved by one or more embodiments of a non-transitory computer-readable medium comprising a program for instructing a computer to perform a method for tile-based rendering, the method including verifying a size of a memory available in an apparatus for rendering, determining a number of buffers required for performing a rendering, based on graphics data input, and determining a size of a tile to be used when performing the rendering, based on the determined number of buffers and the size of the memory available in the apparatus for rendering.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects will become apparent and more readily appreciated from the following description of embodiments, taken in conjunction with the accompanying drawings of which:

FIG. 5 illustrates a method for determining a size of a tile according to one or more example embodiments.

DETAILED DESCRIPTION

Figure 1:
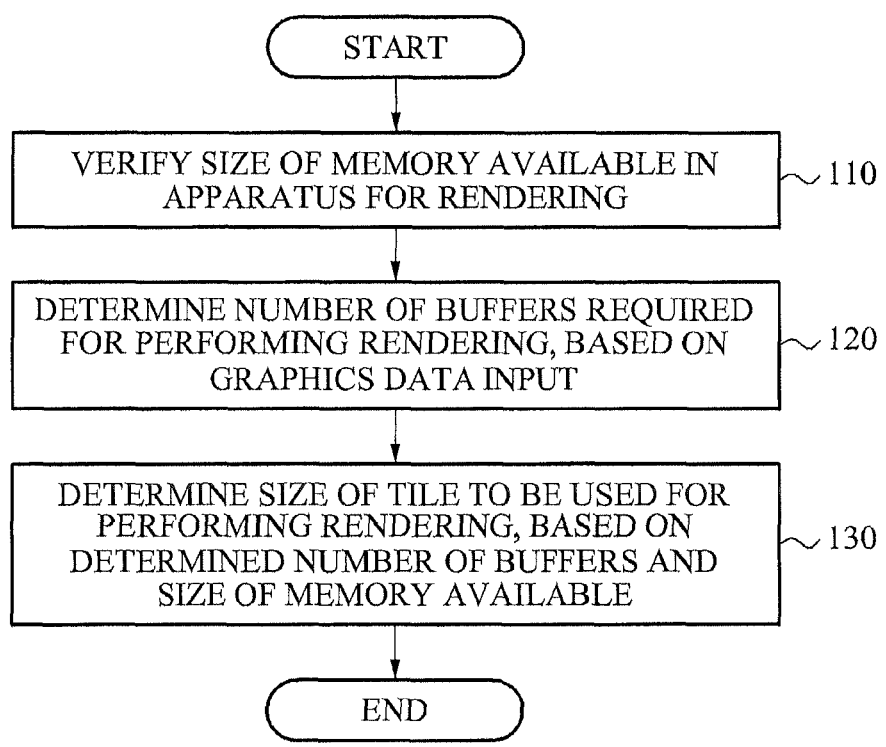
FIG. 1 illustrates a method for tile-based rendering according to one or more example embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 illustrates a method for tile-based rendering according to one or more example embodiments.

In operation 110, a size of a memory available in an apparatus for rendering may be verified.

In operation 120, a number of buffers required for performing a rendering may be determined, based on graphics data input in the apparatus for rendering.

More particularly, at least one type of a buffer required for performing the rendering from among a plurality of distinctive types of buffers may be determined, based on the graphics data input in the apparatus for rendering, and the number of buffers required for performing the rendering may be determined based on the at least one type of the buffer determined. For example, operation 120 may include determining at least one type of a buffer required for performing a rendering from among a plurality of distinctive types of buffers based on the graphics data input, and determining a number of buffers required for performing the rendering based on the at least one type of the buffer determined. The plurality of distinctive types of buffers may be configured by at least one buffer.

The type of the buffer may include, for example, a color buffer, a stencil buffer, a depth buffer, and the like. When performing the rendering, a total of the color buffer, the stencil buffer, and the depth buffer may be necessary, or a portion of the color buffer, the stencil buffer, and the depth buffer may be needed. The type of the buffer required for performing the rendering and the number of buffers required for a plurality of types of the buffer may be determined based on the graphics data.

For example, default requirements for rendering of an apparatus for rendering may be set to be six color buffers, a single stencil buffer, and a single depth buffer. However, according to the graphics data input in the apparatus for rendering, a buffer required for rendering an object may be a single color buffer and a single stencil buffer. In this instance, the apparatus for rendering may determine the number of buffers required for performing the rendering to be two buffers, rather than eight. For example, the apparatus for rendering may determine the type of the buffer required for performing the rendering to be the color buffer and the stencil buffer, and determine the number of buffers required for performing the rendering to be two buffers. In this example, the number of buffers may be obtained by summing a number of color buffers and a number of stencil buffers. Subsequently, the apparatus for rendering may assign a memory to a single color buffer and a single stencil buffer only.

In the example above, only a single color buffer and a single stencil buffer may be required for performing an actual rendering. However, when a memory is assigned to a total of eight buffers, the memory may be unnecessarily assigned to six buffers not actually used for rendering an object. The aforementioned eight buffers may refer to six color buffers, a single stencil buffer, and a single depth buffer. As aforementioned, according to one or more embodiments, the type of the buffer and the number of buffers actually required for performing the rendering on the graphics data may be determined, and the memory may be assigned to buffers determined to be necessary for performing the rendering. According to one or more embodiments, an issue of inefficiency in assigning an unnecessary memory may be resolved by using the buffers to which a memory is assigned and determined to be necessary for performing the rendering.

According to one or more embodiments, a buffer unused for performing the rendering from among the color buffer, the stencil buffer, and the depth buffer may be utilized through being converted to a type of a buffer required for performing the rendering. For example, when only the color buffer is necessary for performing the rendering, and a number of color buffers is insufficient, the stencil buffer and the depth buffer may be used in lieu of the color buffer.

In operation 130, a size of a tile to be used for performing the rendering may be determined, based on the number of buffers determined to be necessary for performing the rendering and the size of the memory available.

The size of the tile may be determined to be inversely proportional to the number of buffers determined to be necessary for performing the rendering. For example, the number of buffers required for performing the rendering may be inversely proportional to the size of the tile. According to one or more embodiments, a memory may be assigned to only a buffer required for performing the rendering. Accordingly, the fewer the number of buffers required for performing the rendering is, the greater the size of the memory to be assigned to a plurality of buffers may become, and the greater a size of the memory is, the greater a size of the plurality of buffers may become. The size of the tile may increase as the size of the buffer increases because the size of each buffer among the plurality of buffers may be obtained by multiplying a width of the tile and a height of the tile. The width of the tile may be a resolution of the width of the tile or a number of pixels on an x axis. The height of the tile may refer to a resolution of the height of the tile or a number of pixels on a y axis.

More particularly, the apparatus for rendering may calculate a quotient by dividing the size of the memory available by the number of buffers, and determine the size of the tile wherein a value obtained by multiplying the width of the tile and the height of the tile is less than or equal to the calculated quotient. For example, the apparatus for rendering may calculate a quotient by dividing the size of the memory available by the number of buffers, and determine the size of the tile for a multiplication of the width of the tile and the height of the tile to be less than or equal to the calculated quotient.

For example, when the size of the memory available is 4 kilobytes (kbyte), more particularly 4096 bytes, and a number of buffers required for performing an actual rendering is two, a size of the buffers may be 2048 kbytes, respectively. When the width of the tile is equal to the height of the tile, one side X of the tile may be determined to be less than or equal to $2048^{1/2}$. In particular, the side X of the tile may be less than or equal to 45.25. Accordingly, a maximum size of the tile may be 45*45. In this example, 1 byte may be required to represent a single pixel.

As described above, the size of the tile may be determined based on the number of buffers required for performing the actual rendering, irrespective of the default requirements for the apparatus for rendering to perform the rendering.

In this example, it is assumed that eight buffers are set to be the default requirements for performing the rendering, a number of buffers required for performing the actual rendering is two, and the width of the tile is equal to the height of the tile. When a memory is assigned to all buffers, a size of the tile may be determined for a side X of the tile to be less than or equal to $(4096/8)^{1/2}$. In particular, the side X of the tile may be less than or equal to 22.62. Accordingly, a maximum size of the tile may be 22*22. When a memory is assigned to a buffer required for performing the actual rendering only, a tile of which a size is four times greater may be used in terms of an area, than a size of the tile when the memory is assigned to a total of buffers. When the size of the tile to be used for performing the rendering increases, a rendering function may be enhanced. For example, the rendering function may be enhanced by reducing an overhead of tile binning for assigning an object to a tile.

When the size of the tile to be used for performing the rendering is determined through operation 130, the apparatus for rendering may perform the rendering on an object based on the determined size of the tile.

Figure 2:
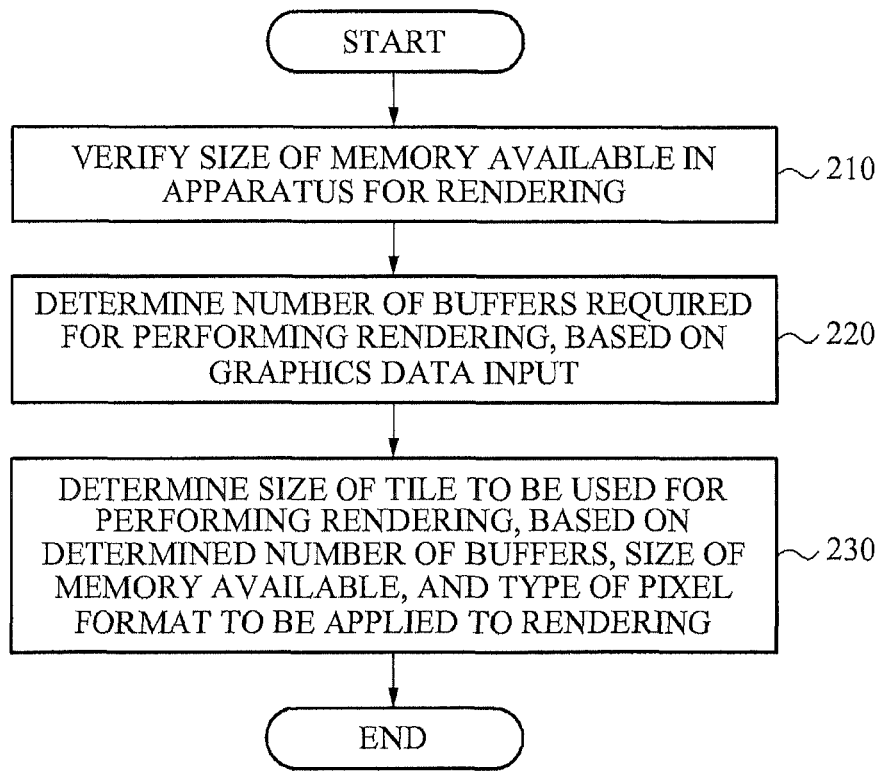
FIG. 2 illustrates a method for tile-based rendering according to one or more example embodiments.

FIG. 2 illustrates a method for tile-based rendering according to one or more example embodiments.

In operation 210, a size of a memory available in an apparatus for rendering may be verified.

In operation 220, a number of buffers required for performing a rendering may be determined, based on graphics data input in the apparatus for rendering.

The graphics data may include reference viewpoint information, light source information, object information, and the like, of 3D graphics data input in the apparatus for rendering. The reference viewpoint information may include information about a camera, and the like. The light source information may include information about a brightness, a location, and a direction of the light source. The object information may include object shape information, object movement information, object property information, a type of a pixel format to be applied to a rendering of the object, and the like. The object movement information may include information about a change of a location, a size, a direction, and the like, of the object. The object property information may include information about an object color, an object material, and the like.

The graphics data may be provided to the apparatus for rendering from an application requesting a rendering.

In operation 230, a size of a tile to be used for performing a rendering may be determined based on the number of buffers determined to be required for performing the rendering, a size of a memory available, and a type of a pixel format to be applied to the rendering.

The size of the tile may be determined based on the number of buffers determined to be required for performing the rendering, the size of the memory available, and the type of the pixel format to be applied to the rendering. For example, operation 230 may be performed based on the type of the pixel format to be applied to the rendering.

The method for determining the size of the tile according to the embodiment of FIG. 2 may be described with reference to FIG. 3.

According to one or more embodiments, a pixel may be represented through being divided into a plurality of samples for anti-aliasing. For example, when the pixel is represented through being divided, a size of a buffer may be determined based on a number of the plurality of samples into which the pixel is divided, rather than based on only a multiplication of the width of the tile and the height of the tile. Accordingly, the greater the number of the plurality of samples is, the smaller the size of the tile becomes.

For example, in OpenGL|ES 3.0, a single pixel may be represented through being divided into four samples. Accordingly, the size of a plurality of buffers may be obtained by multiplying the width of the tile, the height of the tile, and four. The size of the tile may be ¼ in terms of an area compared to a case when the pixel is represented without being divided.

Figure 3:
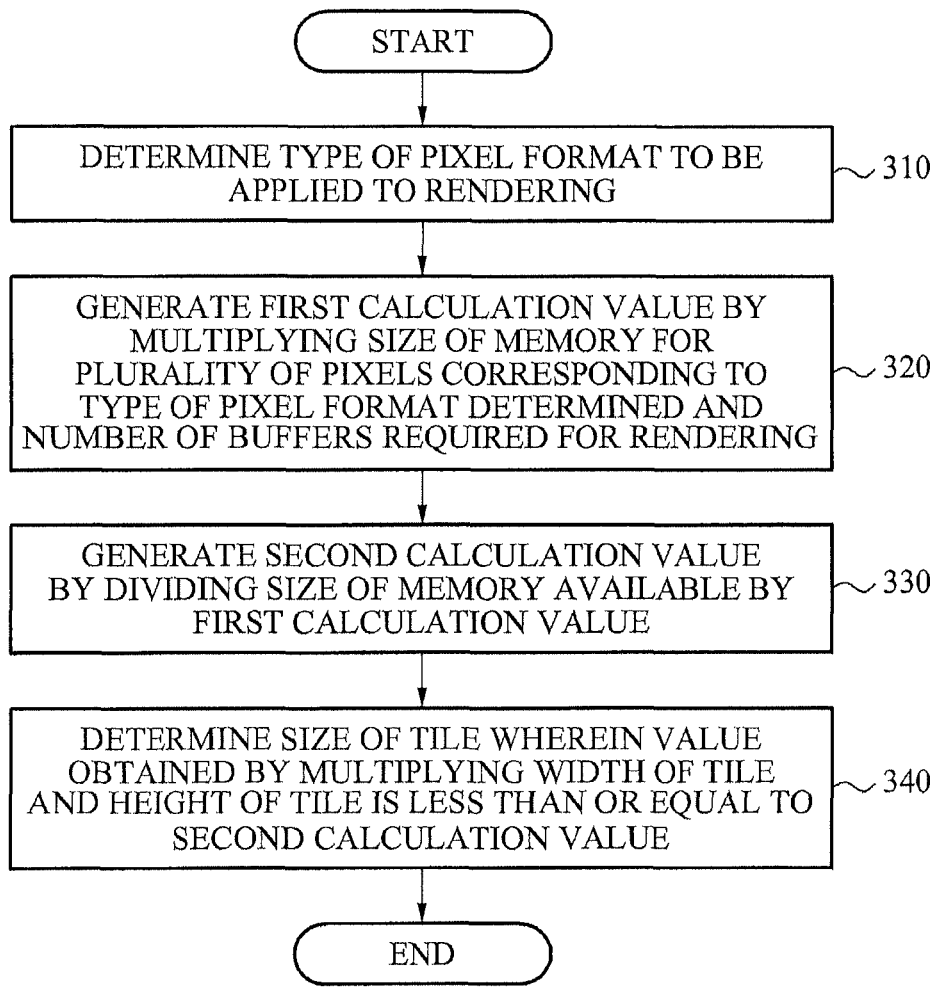
FIG. 3 illustrates a method for determining a size of a tile according to one or more example embodiments.

FIG. 3 illustrates a method for determining a size of a tile according to one or more example embodiments.

Operation 230 described in FIG. 2 may include at least one of operations 310, 320, 330, and 340.

In operation 310, a type of a pixel format to be applied to a rendering may be determined.

For example, the type of the pixel format may be red, green, blue (RGB), RGB Alpha 8888 (RGBA8888), RGBAfloat, and the like.

In operation 320, a first calculation value may be generated by multiplying a size of a memory for a plurality of pixels corresponding to the type of the pixel format determined and a number of buffers required for performing the rendering. For example, the first calculation value may be a result of multiplication of the size of the memory for the plurality of pixels corresponding to the type of the pixel format determined and the number of buffers required for performing the rendering. When the type of the pixel format is RGB, RGBA8888, or RGBAfloat, a size of a memory required for representing a single pixel may be 3 byte, 4 byte, and 16 byte, respectively.

In operation 330, a second calculation value may be generated by dividing a size of a memory available by the first calculation value. For example, the second calculation value may be a quotient obtained by dividing the size of the memory available by the first calculation value.

In operation 340, a size of a tile may be determined in a manner that a value obtained by multiplying a width of the tile and a height of the tile may be less than or equal to the second calculation value. For example, the second calculation value may be greater than or equal to the result of the multiplication of the width of the tile and the height of the tile.

For example, the size of the memory for the plurality of pixels corresponding to the type of the pixel format may be RGBA8888 in 4 bytes, the memory available in an apparatus for rendering may be 32 kbyte, in particular 32768 bytes, and the number of buffers required for performing the rendering may be two. A side X of the tile may be determined to be less than or equal to $\{32768/(4*2)\}^{1/2}$. In particular, the side X of the tile may be less than or equal to 64. In this instance, a maximum size of the tile may be 64*64.

Figure 4:
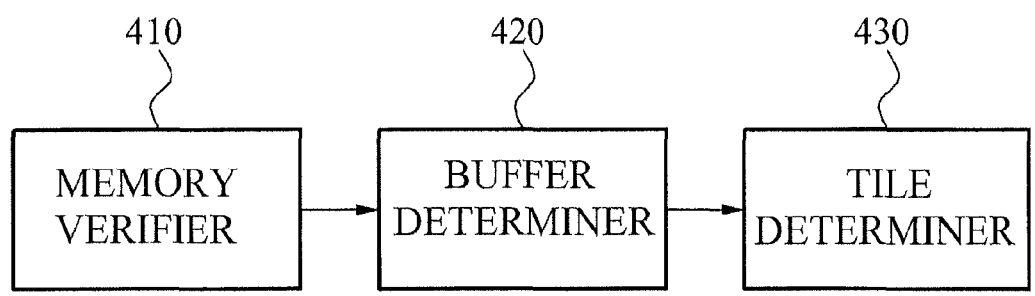
FIG. 4 illustrates an apparatus for tile-based rendering according to one or more example embodiments.

FIG. 4 illustrates an apparatus for tile-based rendering according to one or more example embodiments.

Referring to FIG. 4, the apparatus for tile-based rendering may include a memory verifier 410, a buffer determiner 420, and a tile determiner 430.

The memory verifier 410 may confirm a size of a memory available in an apparatus for rendering. The memory verifier 410 may perform operation 110 described in FIG. 1 and operation 210 described in FIG. 2.

The buffer determiner 420 may determine a number of buffers required for performing a rendering, based on graphics data input in the apparatus for rendering. The buffer determiner 420 may perform operation 120 described in FIG. 1 and operation 220 described in FIG. 2.

The tile determiner 430 may perform operation 130 described in FIG. 1 and operation 230 described in FIG. 2.

The tile determiner 430 may determine a size of a tile to be used for performing the rendering, based on the number of buffers determined to be required for performing the rendering and the size of the memory available.

The apparatus for tile-based rendering may further include a rendering unit (not shown) for performing a rendering on an object, based on the size of the tile determined by the tile determiner 430.

The apparatus for tile-based rendering may be provided on at least one of a portable terminal, a portable multimedia device, a desktop computer, and a laptop computer.

Hereinafter, further descriptions will be omitted because technical aspects described above with reference to FIGS. 1 through 3 may be applied.

FIG. 5 illustrates a method for determining a size of a tile according to one or more example embodiments.

Referring to a Table in FIG. 5, a size of a tile corresponding to a number of buffers and a size of a memory available may be made known. A plurality of fields illustrated in FIG. 5 may be as follows.

A Col field 511 may represent a number of color buffers.

A Depth field 512 may represent a number of depth buffers.

A Stencil field 513 may represent a number of stencil buffers.

A Total field 514 may represent a total number of buffers. In particular, the Total field 514 may represent a sum of the number of color buffers, the number of depth buffers, and the number of stencil buffers.

Square Tile Size fields 515a and 515b may represent a maximum value of a side of a tile when a width of the tile is equal to a height of the tile.

1:2 Rectangular Tile Size fields 516a and 516b may represent a maximum value of the width and a maximum value of the height of the tile when a ratio of the width of the tile to the height of the tile is 1:2.

Memory fields 517a and 517b may represent a size of a memory available.

Hereinafter, an example in which a size of a tile may be verified according to one or more embodiments when a number of color buffers, depth buffers, and stencil buffers is "1", respectively, will be described with reference to FIG. 5.

When the memory available represented by the Memory field 517a is 4 kbyte, and the width of the tile is equal to the height of the tile, the maximum value of the side of the tile may be 37 based on the Square Tile Size field 515a. When the ratio of the width of the tile to the height of the tile is 1:2, the maximum value of the width and the maximum value of the height of the tile may be 26 and 52 based on the Rectangular Tile Size field 516a.

When the memory available represented by a Memory field 517b is 6 kbyte, and the width of the tile is equal to the height of the tile, the maximum value of the side of the tile may be 45 based on the Square Tile Size field 515b. When the ratio of the width of the tile to the height of the tile is 1:2, the maximum value of the width and the maximum value of the height of the tile may be 32 and 64 based on the Rectangular Tile Size field 516a.

A portable device as discussed above may include, for example, mobile communication devices, such as a personal digital cellular (PDC) phone, a personal communication service (PCS) phone, a personal handy-phone system (PHS) phone, a Code Division Multiple Access (CDMA)-2000 (1×, 3×) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (for example, a global positioning system), and the like. Also, the portable device as discussed above may include, for example, a digital camera, a plasma display panel, and the like.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A representing method of a 3D model for tile-based rendering, the method comprising:
   verifying, by a processor, a size of a memory available in an apparatus for rendering;
   determining, by the processor, a number of buffers required for performing a rendering, based on a graphics data input; and
   determining, by the processor, a size of a tile to be used when performing the rendering, based on the determined number of buffers and the verified size of the memory available in the apparatus for rendering,
   wherein the determining of the size of the tile comprises:
   calculating a quotient by dividing the verified size of the memory available by the number of buffers; and
   determining the size of the tile wherein a value obtained by multiplying a width of the tile and a height of the tile is less than or equal to the calculated quotient; and
   wherein the determining of the number of buffers required for the rendering comprises:
      determining at least one type of a buffer required for performing the rendering from among a plurality of distinctive types of buffers, based on the graphics data input; and
      determining the number of buffers required for each of the at least one type of the buffer.

2. The method of claim 1, wherein the determining of the number of buffers required for the rendering comprises:
   converting a first type of a buffer unused for performing the rendering to a second type of the buffer required for performing the rendering,
   wherein the at least one type of the buffer comprises at least one of a color buffer, a stencil buffer and a depth buffer.

3. The method of claim 1, wherein the determining of the size of the tile is performed based on a type of a pixel format to be applied to the rendering.

4. The method of claim 3, wherein the determining of the size of the tile comprises:
   determining a type of a pixel format to be applied to the rendering;
   generating a first calculation value by multiplying a size of a memory for a plurality of pixels corresponding to the determined type of the pixel format and the number of buffers;
   generating a second calculation value by dividing the verified size of the memory available by the first calculation value; and
   determining the size of the tile wherein a value obtained by multiplying the width of the tile and the height of the tile is less than or equal to the second calculation value.

5. The method of claim 1, wherein the plurality of distinctive types of buffers is configured by at least one buffer.

6. The method of claim 1, wherein the graphics data input is provided from an application requesting the apparatus for rendering to perform the rendering.

7. The method of claim 1, further comprising:
   performing a rendering, based on the determined size of the tile.

8. A non-transitory computer-readable medium comprising a program for instructing a computer to perform the method of claim 1.

9. A representing apparatus of a 3D model for tile-based rendering, the apparatus comprising:
   a memory verifier to verify, by a processor, a size of a memory available in an apparatus for rendering;
   a buffer determiner to determine, by the processor, a number of buffers required for performing a rendering, based on graphics data input; and
   a tile determiner to determine, by the processor, a size of a tile to be used when performing the rendering, based on the determined number of buffers and the verified size of the memory available in the apparatus for rendering,
   wherein the buffer determiner determines at least one type of a buffer required for performing the rendering from among a plurality of distinctive types of buffers based on the graphics data input, and determines the number of buffers required for each of the at least one type of the buffer; and
   wherein the tile determiner calculates a quotient by dividing the verified size of the memory available by the number of buffers, and determined the size of the tile wherein a value obtained by multiplying a width of the tile and a height of the tile is less than or equal to the calculated quotient.

10. The apparatus of claim 9, wherein the size of the tile is determined to be inversely proportional to the number of buffers.

11. The apparatus of claim 9, wherein the tile determiner determines a type of a pixel format to be applied to the rendering, generates a first calculation value by multiplying the size of the memory for a plurality of pixels corresponding to the determined type of the pixel format and the number of buffers, generates a second calculation value by dividing the verified size of the memory available by the first calculation value, and determines the size of the tile wherein a value obtained by multiplying the width of the tile and the height of the tile is less than or equal to the second calculation value.

12. The apparatus of claim 9 is provided on at least one of a portable terminal, a portable multimedia device, a desktop computer, and a laptop computer.

13. A representing method of a 3D model for tile-based rendering, the method comprising:
   determining, by a processor, a number of buffers required for performing a rendering, based on a graphics data input; and
   determining, by the processor, a size of a tile to be used when performing a rendering of a graphics data input, based on a number of buffers required for performing the rendering and a size of the memory available in an apparatus for rendering,
   wherein the determining of the size of the tile comprises:

calculating a quotient by dividing the size of the memory available by the number of buffers; and determining the size of the tile wherein a value obtained by multiplying a width of the tile and a height of the tile is less than or equal to the calculated quotient; and wherein the determining of the number of buffers required for the rendering comprises:

determining at least one type of a buffer required for performing the rendering from among a plurality of distinctive types of buffers, based on the graphics data input; and determining the number of buffers required for each of the at least one type of the buffer.

14. The method of claim 13, wherein the determining of the size of the tile comprises:

determining a type of a pixel format to be applied to the rendering;

generating a first calculation value by multiplying a size of a memory for a plurality of pixels corresponding to the determined type of the pixel format and the number of buffers;

generating a second calculation value by dividing the size of the memory available by the first calculation value; and determining the size of the tile wherein a value obtained by multiplying the width of the tile and the height of the tile is less than or equal to the second calculation value.

15. A representing method of a 3D model for tile-based rendering, the method comprising:

determining, by a processor, a number of buffers required for performing a rendering, based on a graphics data input; and determining, by the processor, a size of a tile to be used when performing a rendering of a graphics data input, based on a size of a memory required for representing a single pixel according to a pixel format of the graphics data input and a number of buffers required for performing the rendering and a size of the memory available in an apparatus for rendering, wherein the determining of the size of the tile comprises:

calculating a quotient by dividing the size of the memory available by the number of buffers; and determining the size of the tile wherein a value obtained by multiplying a width of the tile and a height of the tile is less than or equal to the calculated quotient; and wherein the determining of the number of buffers required for the rendering comprises:

determining at least one type of a buffer required for performing the rendering from among a plurality of distinctive types of buffers, based on the graphics data input; and determining the number of buffers required for each of the at least one type of the buffer.

16. The method of claim 1, wherein the determining of the number of buffers required for the rendering comprises summing the number of buffers required for the each of the at least one type of the buffer.

* * * * *